Jan. 31, 1961  W. N. HUBERT  2,969,907
REINFORCED BAG

Filed April 15, 1958  2 Sheets-Sheet 1

INVENTOR.
WARREN N. HUBERT,
BY
ATTORNEYS.

Jan. 31, 1961 W. N. HUBERT 2,969,907
REINFORCED BAG
Filed April 15, 1958 2 Sheets-Sheet 2
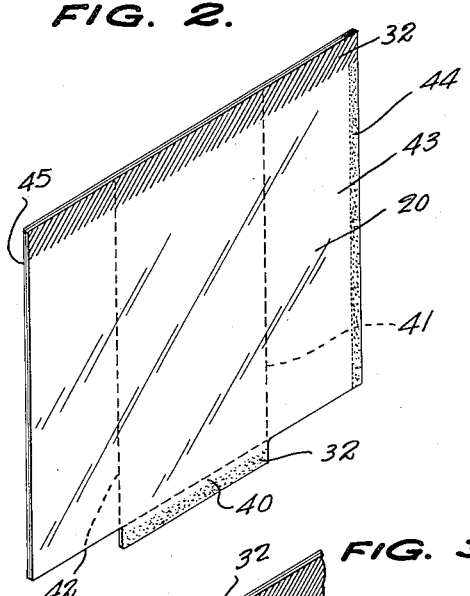
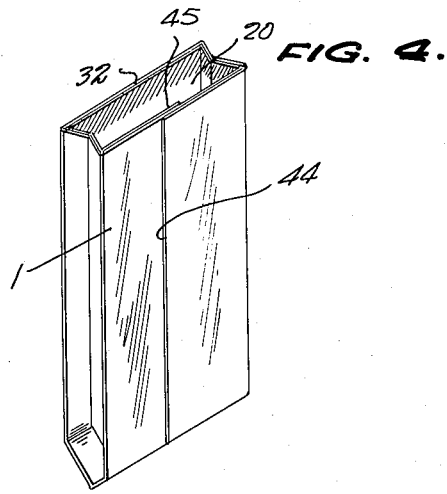
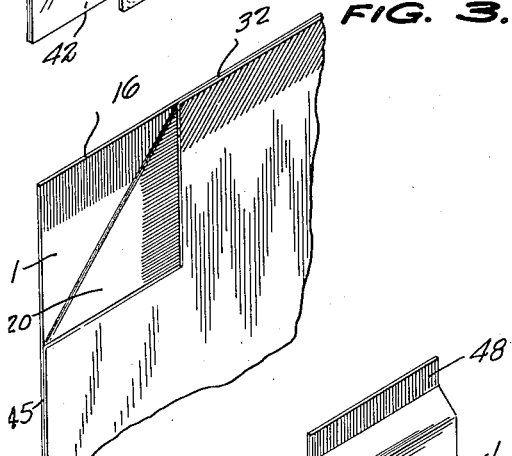
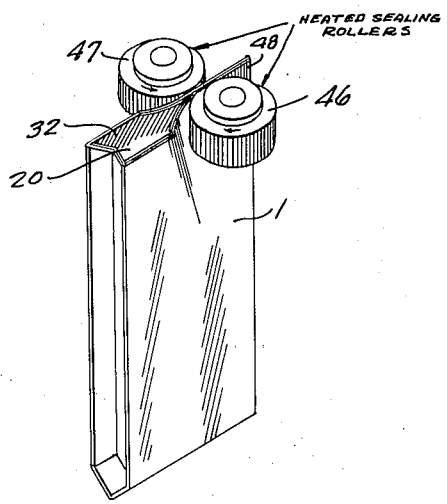
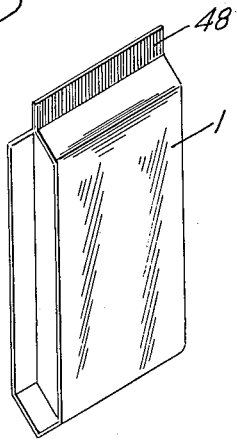
INVENTOR.
WARREN N. HUBERT,
BY
ATTORNEYS.

2,969,907
REINFORCED BAG

Warren N. Hubert, Dallas, Tex., assignor to Dixie Wax Paper Company, Dallas, Tex.

Filed Apr. 15, 1958, Ser. No. 728,730

1 Claim. (Cl. 229—55)

The present invention is concerned with the method of producing multi-ply bags of waxed sheet material having an outer tubular bag and corresponding inner liner initially joined at their opposing marginal end portions and capable of being permanently joined with the closing of the liner after the filling thereof.

The principal object of the present invention is to provide a multi-ply bag with each ply having wax or the equivalent applied to both faces thereof and which bag has a tubular outer bag and a tubular liner inserted within said outer bag closed at their lower ends, a marginal band of a heat sealable material between at least the mouth of said outer bag and said liner with said bag and liner mouth being temporarily connected thereby to permit their handling together during the filling of said liner and said liner having opposing faces coated with a heat sealable material whereby upon application of pressure and heat to the mouth of said bag, the opposing end faces of said liner and said outer bag and said liner mouth will be permanently joined sealing the entire bag.

A still further object of the invention is to provide a bag formed from multi-ply webbing having a band of heat sealable material at spaced intervals corresponding to the length of the bag applied to an opposing face of at least one ply of said webbing and a wax or the like coating applied to both faces of each ply and over said band of heat sealable material and bands of heat sealable material applied over the wax coating at said spaced intervals on a non-opposing face of at least one ply of said webbing forming heat sealable end portions for the resulting bag.

Further objects of the invention will be in part obvious and in part pointed out in the following detailed description of the drawings, in which:

Fig. 2 is a perspective view of a bag blank cut from said webbing.

Fig. 3 is an enlarged view showing a portion of said bag blank and the heat sealable bands thereon.

Fig. 4 is a perspective view of an open top bag made in accordance with the present invention.

Fig. 5 is a view similar to Fig. 4, but showing the manner of heat sealing the same; and Fig. 6 is a further perspective view of the bag after filling and sealing thereof.

Figure 1:
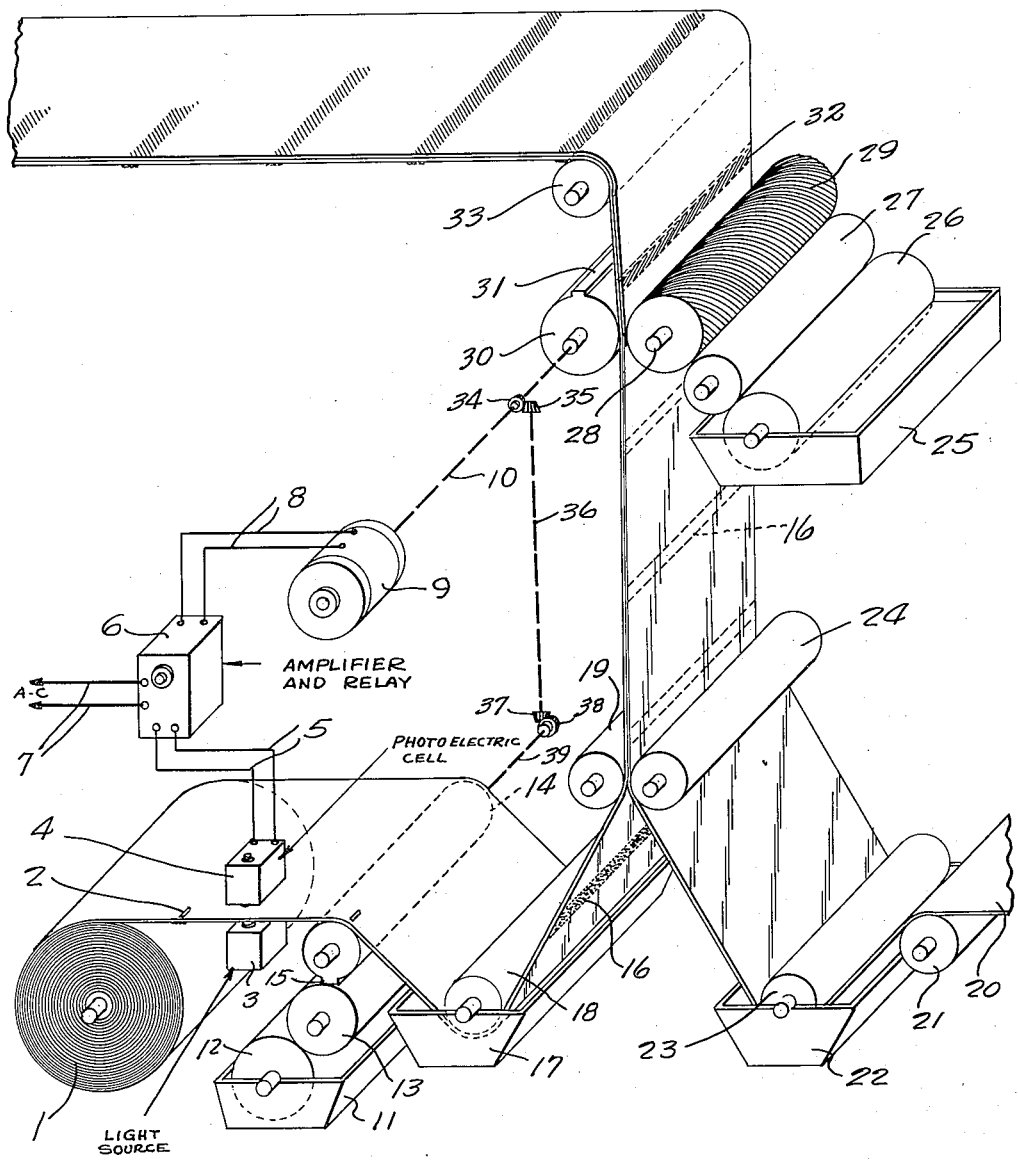
Fig. 1 is a schematic perspective view of an apparatus for producing multi-ply bag forming webs of sheet material according to the present invention.

Referring now more particularly to the accompanying drawings, wherein like and corresponding parts are designated by similar reference characters, a continuous web of sheet material is indicated by the numeral 1 which material is of a width corresponding to the width of a bag blank to be produced therefrom. Said web has indicia 2 provided along the edge thereof at spaced intervals, that is, for example spaced apart a distance substantially the equivalent of the length of said bag blank while additional printed matter can be placed between said indicia across the webbing which printed matter could be that appearing on the outside of the finished bag as the top of webbing 1 forms the outside of the resulting duplex bag produceable therefrom.

As webbing 1 is fed from the roll thereof, it passes over a source of light 3 therebeneath. A photoelectric cell 4 is positioned above said webbing and said source of light with the indicia 2 passing therebetween breaking the beam of light from 16 which normally passed through said webbing causing the photoelectric cell to temporarily break electrical current passing through wires 5 to an amplifier and relay 6. Said amplifier and relay 6 is connected to a source of electrical current through wire 7 and further connected by wires 8 to an electric motor 9. Thus the action of the indicia breaking the current in the photoelectric cell effects the amplifier and relay in such a manner as to vary the speed of the motor 9. Said motor 9 further has a shaft 10 for purposes to be described hereinafter.

Further in the path of said webbing and extending laterally thereof is a bath 11 containing a thermoplastic heat seal adhesive in a molten condition. A roller 12 is partially submerged in said adhesive and upon rotation picks up a fine film of the adhesive on the periphery of said roller which is transmitted to a further roller 13 in rolling contact therewith. Above said roller 13 is rotatably mounted a roller 14 which supports said webbing over the light 3. Said roller 14 may be heated in any conventional manner and has a longitudinally and radially extending projection 15 of a depth equal to the space between rollers 13 and 14 whereupon said projection contacts roller 13 picking up adhesive therefrom and upon further rotation contacts the bottom side of webbing 1 transferring the same as a lateral band 16 across said webbing.

Further, in the path of said webbing and extending laterally thereof is a bath 17 of a coating material in a molten state such as paraffin or the like and supporting a roller 18 partially submerged in said coating material. Said bath 17 is maintained in a heated condition by conventional means not shown. Webbing 1 after leaving roller 14 passes over roller 18 into said coating composition whereupon both sides of said webbing receives a coating completely thereover which coating also extends over the bands of heat sealing material 16 as well as any printed matter upon said webbing. The webbing thereafter passes from roller 18 to a cooling roller 19 for having tht paraffin coating hardened thereby.

A second web of sheet material 20 which is of substantially the same width as webbing 1 is fed to a roller 21 and passes therefrom into the bath 22 of a coating composition such as paraffin or the like beneath roller 23 partially submerged in said coating composition whereby said webbing obtains a coating completely over both faces thereof. Said bath 22 is maintained in a heated condition by conventional means not shown. Webbing 20 after being coated passes upwardly around a cooling roller 24 where it is brought into face to face contact with webbing 1 and with the heat sealing material 16 therebetween for superimposing webbing 20 upon webbing 1 hardening the coating thereon but not joining the webbings.

The superimposed webbings 1 and 20 after leaving rollers 19 and 24 pass by a bath 25 containing a heat sealing material in a molten state. Said bath contains a roller 26 partially submerged in said heat sealing material and being in rolling contact with a roller 27 for transferring heat sealing material picked up by the periphery of roller 26 from said bath. Roller 27 is further in rolling contact with a heated roller 29 having a knurled peripheral surface providing spiral grooves thereon. An example of suitable knurling is to provide a 5.4 inch diameter seamless steel tubing that is knurled with one wheel of a fourteen pitch knurling tool which grinds the spiral grooves to a depth of .010 inch into the periphery of said tubing at an angle of approximately 45° to the axis of said tubing. Said tubing can be employed as roller 29 with a heated media passing therethrough for maintaining the same in a heated condition.

Webbings 1 and 20 pass between roller 29 and a roller 30 on the opposite side of said webbing but with the webbing spaced from both rollers. Roller 30 has a longitudinally and radially extending projection 31 along the length thereof which is of a depth substantially equal to the distance between rollers 29 and 30. Roller 30 may be heated in any suitable manner and is connected to shaft 10 of motor 9 in such a manner that it is rotated by said motor for having projection 31 contact webbing 1 as each band of heated sealing material 16 passes between rollers 29 and 30, whereupon said webbing is pressed against rollers 29 producing succeeding lateral bands of heat sealing material 32 upon webbing 20 which due to the grooves on roller 29 is pressed into said webbing. Each band 32 coincides with a band 16 and due to the pressure and heat employed in applying each band 32 causes the underlying band 16 to temporarily and partially heat seal the webs 1 and 20 together at their point of contact at each band 16.

Shaft 10 can have a gear 34 fixedly mounted thereon meshing with the gear 35 driving a shaft 36 which also has a gear 37 meshing with gear 38 driving the shaft 39 of roller 14 for coordinating the contact of projections 15 and 31 with said webbing to insure the coinciding of bands 16 and 36.

After the formation of bands 32, the superimposed webbings 1 and 20 pass over a cooling roller 33 which partially hardens the heat sealing material joining the webbings together.

The joined webbing is subsequently presented to a bag blank forming machine which severs blanks such as shown in Fig. 2 therefrom. In said Fig. 2 the inner face of the duplex bag blank is shown which inner face is provided by a webbing 20 which has lateral bands 32 of heat sealing material extending across the top and bottom marginal edges thereof, while web 1 forms the outer ply of said blank. Portions of the webbing on each side of the bottom tab 40 are removed leaving said tab 40 extending longitudinally from the bottom edge of the blank. A strip of adhesive or heat sealing material 43 can be placed along the edge 44 of said blank and the blank folded along the lines 41 and 42 coinciding with the ends of tab 40 in order that edge 44 overlaps edge 45 forming a duplex tube. Adhesive 43 may be self drying, or if of pressure or heat sealable material affixed to webbing 1 underlying the same as shown in Fig. 4 connected thereto by heat or pressure.

Tab 40 is folded upwardly over the face of webbing 1 and affixed thereto by the application of heat or pressure closing the bottom of the bag. The bag is then left open at the top as in Fig. 4 and the same may be filled in any suitable manner. The bag is accordingly of a duplex nature with webbing 20 forming the inner lining bag or ply, while webbing 1 forms the outer bag or ply. After filling the bag the same may be closed by passing the top marginal edge between heat sealing rollers 46, 47 as shown in Fig. 5 which results in a heat sealed band 48 completely across the top of the bag. This application of heat and pressure causes the band 32 at the top of the liner to intermix and form the seal and also further causes the band 16 to permanently connect the liner and outer bag, forming an especially strong and permanent seal. The band 16 between the plies of tab 40 is likewise permanently joined with the plies during the sealing of said tab. Bands 16 only partially join the webbings together when between rollers 29 and 30, because said bands are beneath the wax coating or ply 1 while bands 32 are over the wax coating on the ply 20. Therefore the plies or webbings 1 and 20 are only partially joined by the band 16 until the final application of heat or sealing the bands 32 which then permanently seal the plies or webbings with the bands 16.

The particular adhesive contained in vats 11 and 25 is not limited to any particular form of material, but for example a blend of synthetic and modified natural resins and waxes having a softening point of 90-92° C. as made by the ball and ring method may be employed and one such material is Proxmelt No. 37-161-20 produced by the Pyroxylin Products Inc. Lacquer or solvent types of hot melt adhesives containing a natural or synthetic resin such as thermoplastic resins, thermo-setting resins in a thermoplastic stage may be used or mixtures of thermoplastics and thermo-setting resins or resin mixtures with waxes, waxes given adhesive properties by the inclusion of natural or artificial rubber or thermoplastic cellulose compounds also may be employed.

The webbings 1 and 20 may be of any material suitable for making bags as for example paper such as glassine papers or super-calendarized opaque sulphite paper. The coating material contained in baths 17 or 22 may be of a paraffin or wax or the like which coats or penetrates said webbing in order to render the same moisture or moisture vapor proof and the webbing after coating may be similar to the sheet materials described in United States Patents Nos. 2,118,152; 2,367,563 and 2,624,246. However, such sheet materials are given merely by way of examples and are not to be considered as excluding other bag forming materials suitable for the present purpose. Each webbing 1 or 20 has been found to be suitable where the wax is applied in the amount of one and one-half pounds per ream per side of each web.

The rollers indicated as being heated or cooled may have their temperatures modified in any conventional manner such as by the passage of a hot or cold media through the rollers where provided with hollow interiors.

The present process and apparatus and form of bag blank and bag are capable of considerable modification and such changes thereto as come within the scope of the appended claim are deemed to be a part of the present invention.

What I claim is:

A multiply bag comprising an outer tubular bag having a straight top edge, a tubular liner extending within said outer bag and also having a straight top edge forming the mouth of the bag, said outer tubular bag having a band of a heat sealable material on the inner marginal top end portion thereof, said liner top edge being positioned coinciding with said outer bag top edge, a wax composition coating both faces of said outer bag with said heat sealable material extending therethrough, a wax composition coating both faces of said liner, said band of heat sealable material sealing the top inner marginal portion of said outer bag to the top outer marginal portion of said liner with said bag and liner top edges coinciding, said liner having a band of heat sealable material on the inner top marginal portion thereof over said wax composition for sealing close the mouth of the bag when desired and said bag and liner being closed at the ends thereof opposite said top edges.

References Cited in the file of this patent

UNITED STATES PATENTS

| | | |
|---|---|---|
| 2,087,444 | Potdevin | July 20, 1937 |
| 2,237,327 | Bell | Apr. 8, 1941 |
| 2,292,295 | Royal | Aug. 4, 1942 |
| 2,341,845 | Mark et al. | Feb. 15, 1944 |
| 2,372,735 | Palmer | Apr. 3, 1945 |
| 2,751,140 | Brady | June 19, 1956 |
| 2,854,186 | Williams | Sept. 30, 1958 |